July 8, 1958  J. CRAGGS ET AL  2,842,257
EXTENSIBLE FLEXIBLE FRAME CONVEYOR AND
METHOD OF MINING THEREWITH
Filed July 11, 1955  6 Sheets-Sheet 1

INVENTOR.
Joseph Craggs
BY  Keith McCann
Murray G. Gleeson
ATTORNEY

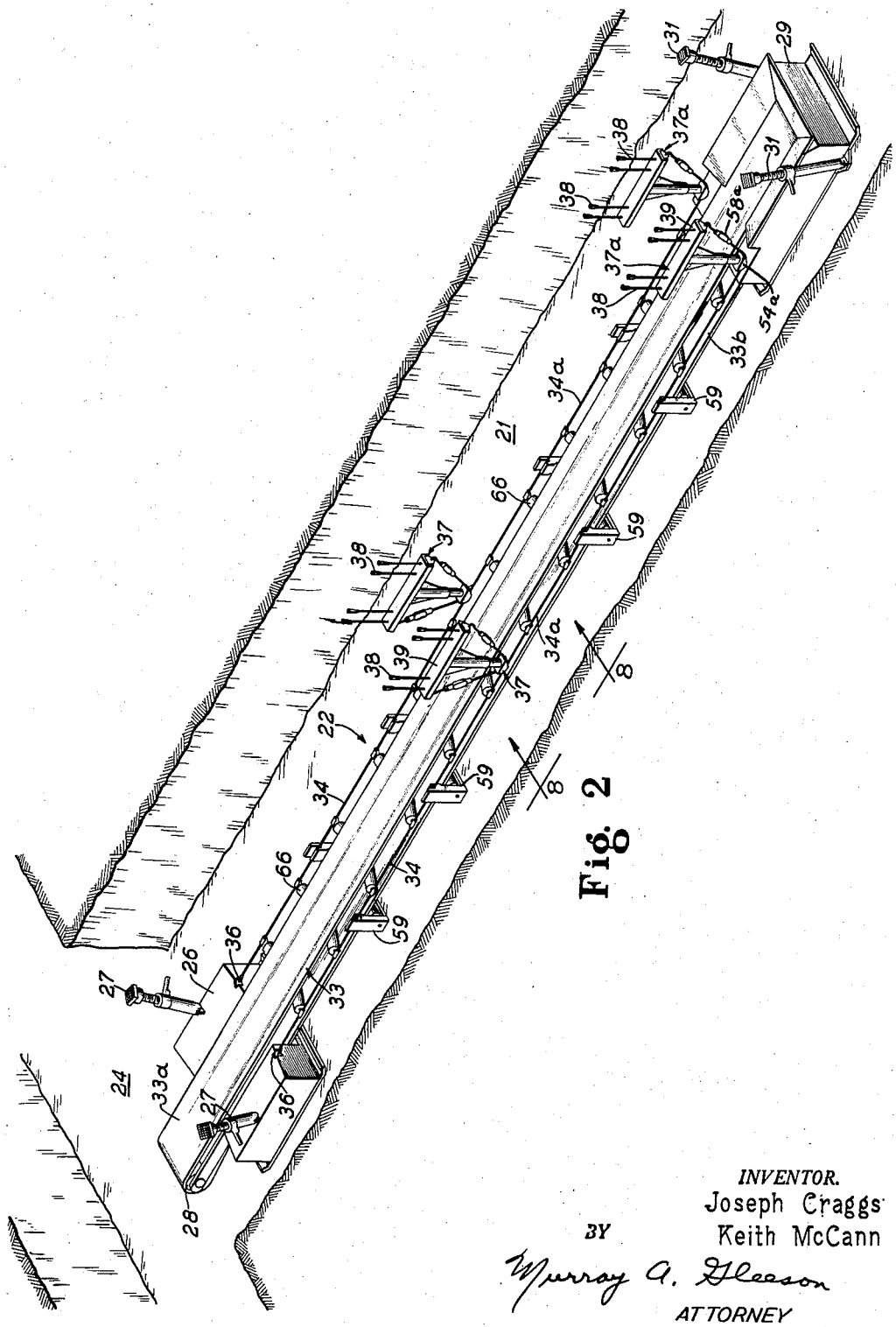

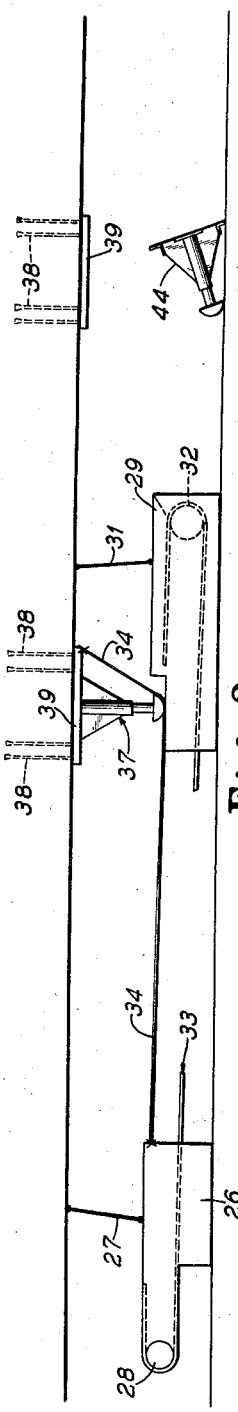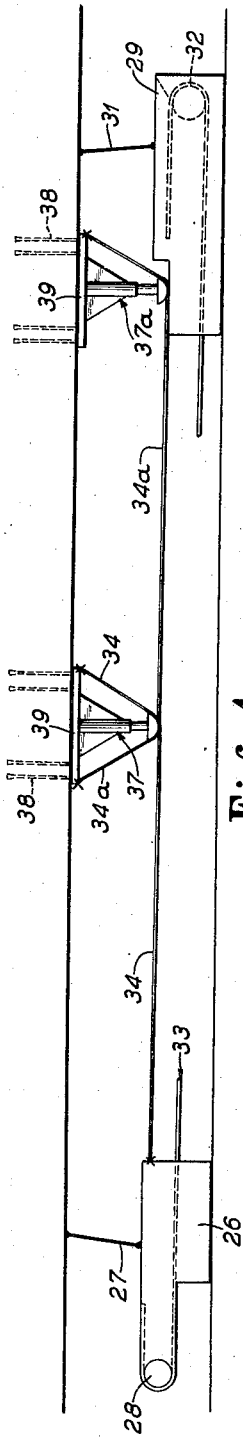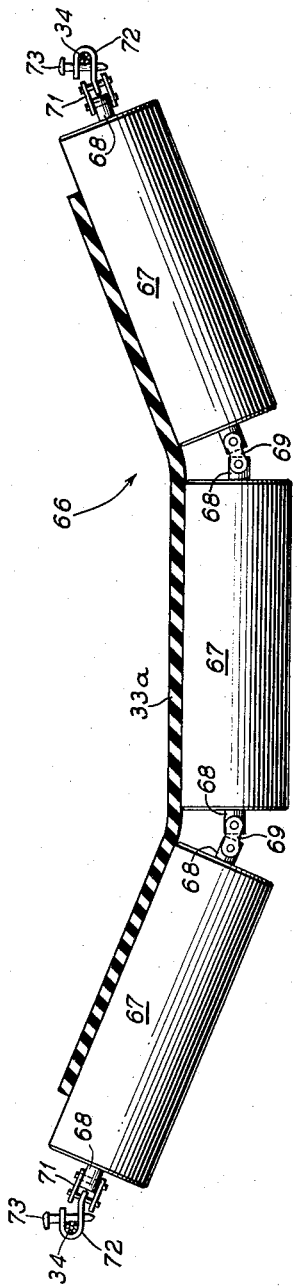

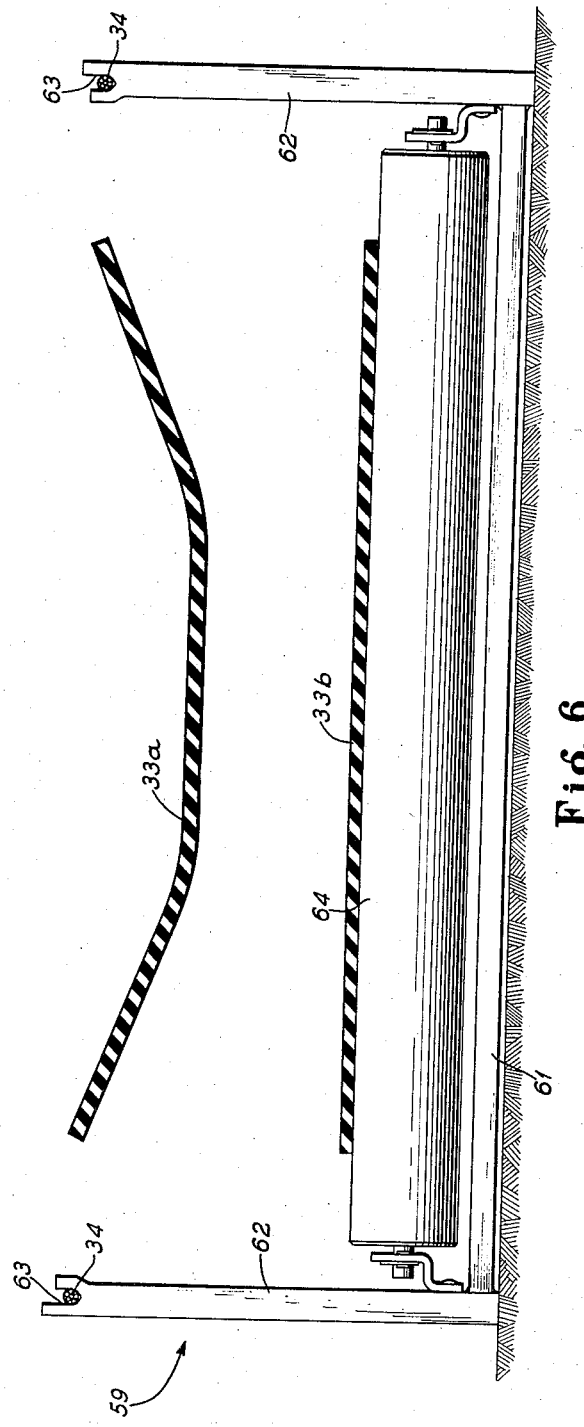

July 8, 1958   J. CRAGGS ET AL   2,842,257
EXTENSIBLE FLEXIBLE FRAME CONVEYOR AND
METHOD OF MINING THEREWITH
Filed July 11, 1955   6 Sheets-Sheet 5

INVENTOR.
Joseph Craggs
BY  Keith McCann

ATTORNEY

INVENTOR.
Joseph Craggs
Keith McCann
BY
Murray A. Gleeson
ATTORNEY

United States Patent Office 2,842,257
Patented July 8, 1958

2,842,257

EXTENSIBLE FLEXIBLE FRAME CONVEYOR AND METHOD OF MINING THEREWITH

Joseph Craggs and Keith McCann, Taylorville, Ill., assignors to Goodman Manufacturing Company, Chicago, Ill., a corporation of Illinois Application July 11, 1955, Serial No. 521,095

15 Claims. (Cl. 198—139)

This invention relates to flexible frame conveyors and particularly to a wire-rope-supported conveyor and the method of using the conveyor in underground mining so that the conveyor can be extended quickly to follow behind an advancing mine face.

A conventional rigid frame conveyor requires the major part of a working shift to extend it. Thus, on the day that the conveyor is extended, that particular section of the mine loses a shift's production.

In many mining operations, coal mining for example, there is a period of thirty minutes or so in which men who have worked one shift are leaving the mine and an additional period in which men are coming in to work the next shift. This makes a total period of an hour, or even more, during which the face is free. It is a primary object of the present invention to provide a conveyor which can be extended in that particular hour so that three shift, round-the-clock production can be maintained.

By the present invention, the conventional fabricated steel framing and cover plates are entirely eliminated and replaced by multiple pairs of wire ropes, chains, cables or other flexible strands, anchored to the ground along the length of the conveyor and tensioned independently of the conveyor belt. The tensioned strands are supported at intervals along the floor by spreader-stands or jacks and they in turn carry idler roller assemblies for the load-carrying reach of the belt. The belt will be maintained separately tensioned between a head (outbye) and tail (inbye) section, both of which are fixed as by jacking them down against the ground. To extend the belt conveyor, the belt tension is released sufficiently to permit breaking it and adding a new length of belting. Then the tail section will be moved forwardly, stretching the belt out into place, and an additional pair of flexible rope strands will be stretched alongside the belt between anchors which are fixed into the ground. When the added ropes are tightened by turnbuckles, ground-supporting spreader-stands are placed at intervals under the ropes, and belt-supporting rollers are suspended across the strands and from the ground supporting stands themselves in some cases, the extended conveyor is ready to operate again. The inventors have found, by actual experience, that this improved conveyor can be extended within an hour, as contrasted with their own experience in extending conventional conveyors which have required the major part of a full working shift.

Other objects and advantages will be apparent from the following description taken in connection with the drawings in which:

Figure 2 is a view similar to Figure 1 of the same conveyor with an additional length added in the inbye direction;

Figure 3 is a schematic side view of Figure 1 showing how the initial pair of flexible cables have one end fixed adjacent the head section and the other end is anchored at a point near the tail section remote from the head section;

Figure 4 is a schematic side view of Figure 2, illustrating how the second (and successive) pair of supporting strands is anchored at opposite ends to the ground and is therefore tensioned entirely independently of the belt itself;

Figure 5 is a transverse sectional view of Figure 1 taken along the line 5—5 and showing one form of load-supporting roller assembly which has been successfully used;

Figure 6 is a cross sectional view of Figure 1 taken along the line 6—6 and showing one of the stands for supporting the wire ropes from the ground and also for carrying idler means which supports the lower reach of the belt;

Referring now more particularly to the drawings, it will be recognized that Figures 1, 2, 3 and 4 have been condensed, lengthwise, in order to illustrate the complete conveyor in the space available.

Figure 1:
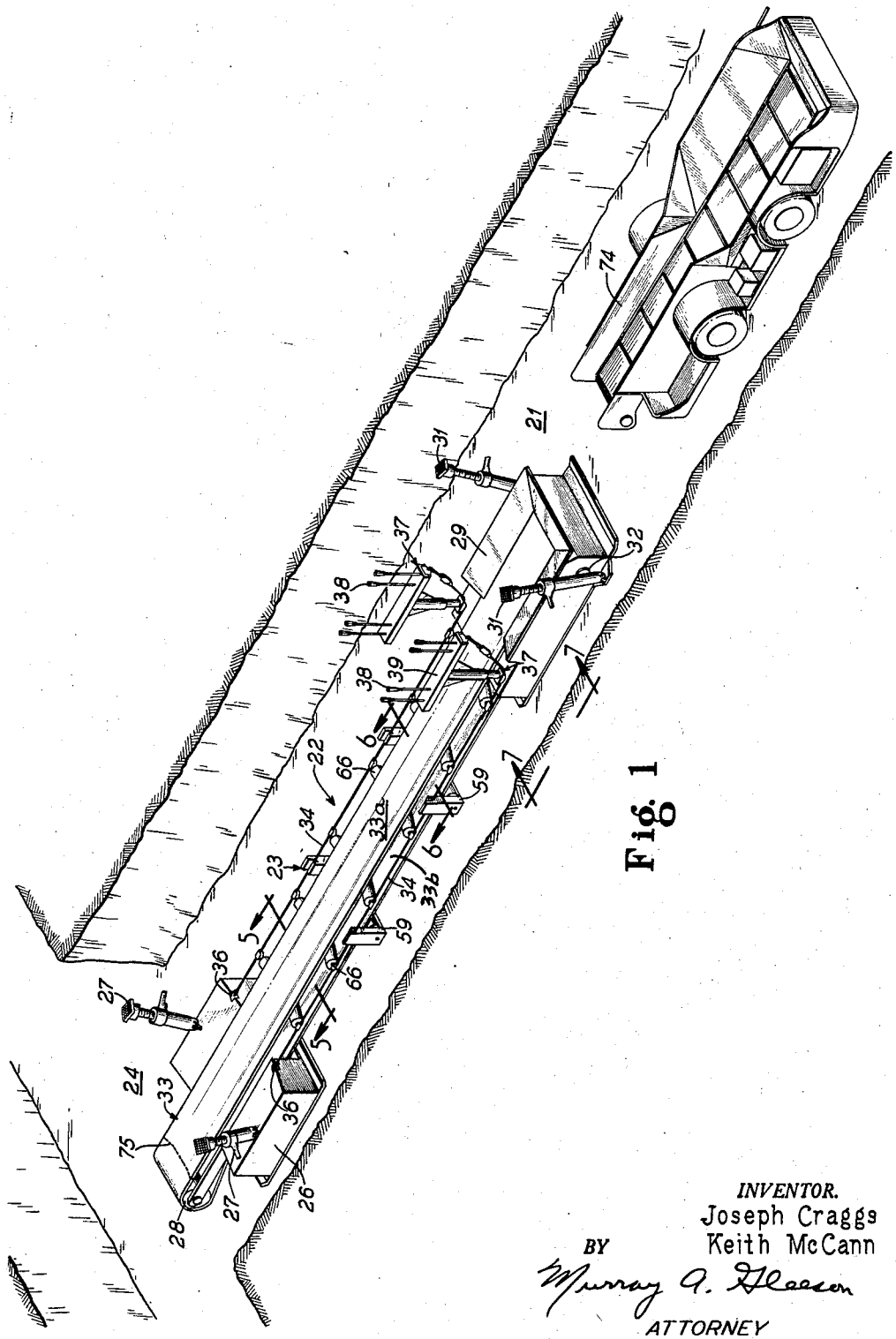
Figure 1 shows a preferred embodiment of an initial length of conveyor made in accordance with the present invention, this being a cut-away, isometric mine view, illustrated somewhat schematically.

In Figure 1, an initial conveyor set-up is shown in a room 21 which is being advanced to the right by a mining operation of some kind, details of which are not pertinent here. The conveyor, generally designated 22, has its initial conveyor section 23 set at the outbye end of the room and discharges into an entry 24 where the mined material will be taken away by suitable means such as mine cars, shuttle cars, or belt conveyors (not shown).

The initial conveyor section 23 includes a head section 26 held down by roof jacks 27, 27 and having a driving pulley 28 powered by suitable drive means (not shown). A tail section 29, jacked down by jacks 31, has the usual idler pulley 32. An endless belt 33 is trained about the pulleys 28, 32 and has an upper reach 33a and a lower reach 33b which are respectively load-carrying and return reaches. The head and tail sections will be maintained a fixed distance apart by the jacks 27, 31 which maintain a load-carrying tension in the upper reach 33a.

Figure 7:
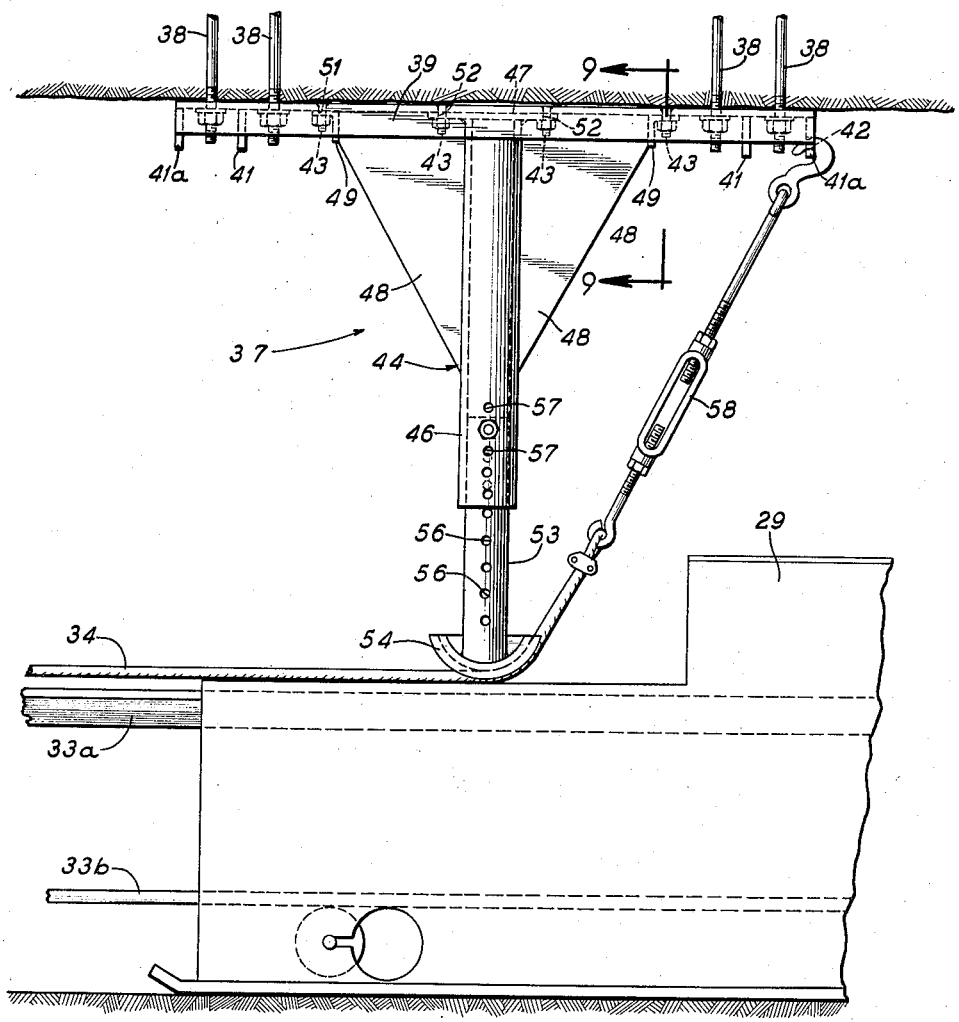
Figure 7 is an enlarged side view of Figure 1 taken along the line 7—7 showing details of the ground-supported anchor for the inbye end of the wire ropes.
Figure 9:
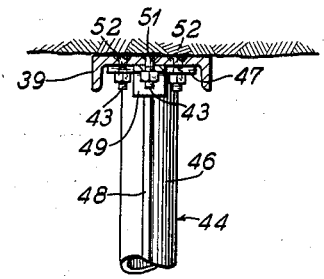
Figure 9 is an end view of one of the ground anchors taken along the line 9—9 of Fig. 7.

Stretched taut alongside of the conveyor, and comprising part of it, are flexible strand means, such as cables or wire ropes 34, 34. The wire ropes, and their anchoring means are identical so will be described for only one rope. One end of each rope is fixed adjacent the head section by a connection 36 to the latter. The other end is attached to a T-shaped anchor generally designated 37, details of which will now be described in connection with Figure 7. Each anchor 37 is ground supported, that is to the roof by roof bolts 38 but may be fixed in any other suitable manner adjacent the tail section and independent of the tension in the belt. Each ground anchor 37 comprises a liner 39 in the form of a steel channel member having a pair of transverse plates 41, 41a welded crosswise in each end of the channel. Each plate has an opening for 42 for a cable hook or "come-along" used in initially assembling the ropes. Four depending studs 43 are welded to the base of the channel. The anchor 37 also includes a depending, removable, vertical leg 44 comprising a tubular section 46 having a transverse plate 47 welded across the top end and having triangular reinforcing webs 48, 48 extending upward from the sides and terminating in short transverse angle pieces 49, 49. The angle pieces 49 and the plate 47 are provided with holes 51, 52 respectively for receiving the depending studs 43, and holding the two major parts of the anchor together. Telescopically assembled within the tubular section 46 is a smaller tube 53 which terminates at the bottom in a curved shoe 54. The height of the shoe 54 must be adjustable in order to maintain the inbye end portions of the ropes 34 at the same level to, in turn, maintain the belt level. This vertical adjustment in the particular embodiment shown is obtained in practically infinite increments by drilling a series of through holes 56, 56 in the inner tube 53 at two and one-half inch spacing and drilling a similar number of through holes 57, 57 in the tubular section 46 at some different, regular, spacing such as two inches. This makes it possible to match up one of the holes 56 with one of the holes 57 at one-half inch increments in the adjusted height of the shoe 54.

By employing the separate liner 39, we find we can greatly increase the efficiency of extending the belt by having the liner 39 bolted to the roof ahead of time. This can be done on shift without interfering with mining operations as long as the depending vertical leg 44 is left off so as not to be in the way of the passage of shuttle cars and other vehicles. This is a very important part of the present invention because it may sometimes take as much as an hour, or even more, to install a pair of liners 39 and get them properly leveled where the roof is bad.

In setting up the belt initially, after the legs 44 have been securely bolted onto studs 43, the ropes 34 will be laid out along the conveyor, around the shoes 54 and tensioned by a temporary jack or "come-along" acting between the apertured plate 41 and the rope. When the rope is taut and all the slack is removed by the "come-along," a turnbuckle 58 will be fastened between the apertured plate 41a and the end of the rope. The temporary "come-along" will then be removed and is not shown in the drawings.

In order to prevent the catenary droop of the ropes from being excessive, and in order to maintain the belt spread apart properly, ground-supporting spreader-stands 59 are placed at intervals along the line. One of these is shown in Figure 6 and comprises a horizontal plate 61 having welded thereto a pair of upstanding plates 62, 62 terminating in upwardly open V-grooves 63, 63. To support the return reach of the conveyor each of the spreader-stands 59 may be provided with a return roller 64.

The belt load-carrying upper reach 33a, as shown in Figure 5 is supported between the cables 34, 34 by a flexibly assembled idler unit generally designated 66 and including three idler rollers 67, 67, 67. Each roller 67 runs on a non-rotatable shaft 68 and the inner roller 67 is connected to the outer rollers through a pivotal joint 69 having a longitudinal axis so that the assembly can work up and down flexibly to compensate for varying loads and off center loading conditions. The outer connections 71, 71 are pivotable about generally vertical axes, that is at right angle to the axes of the joint 69, and provide connections with brackets 72 which grip the ropes and are held in place by spikes 73.

In use, again referring to Figure 1, shuttle cars such as the one designated 74 may run back and forth between the belt and the mining face, depositing coal onto the tail section 29 whence it will be discharged from the head section into whatever further transportation equipment is supplied.

As pointed out above, one of the very great advantages of the present invention is that the conveyor can be extended so quickly as to permit three shift, around-the-clock operation.

Assuming now that the mining face has advanced far enough away from the initial conveyor section 23 to require an extension another section will be added as follows:

Starting with the conveyor shown in Figure 1, the jacks 31 will be released following which the tail section 29 can be moved back enough to take all the tension out of the belt. At that time, or just prior thereto, the driving pulley 28 will be inched around enough to put the belt joint 75 on the top reach at the outbye end as shown in Figure 1. The joint will be broken, a new belt section spliced into it and then the tail section 29 will be pulled forward a distance amounting to one-half the length of the inserted belting. The other end of the inserted belting will then be spliced into the original belt and the new belting as shown in Figure 2 will be, usually, about twice the length of the initial conveyor.

As part of the make-ready for this operation, the liners 39 will have previously been bolted in place as shown in Figure 3 and the legs 44 will be standing by ready for attachment.

Figure 8:
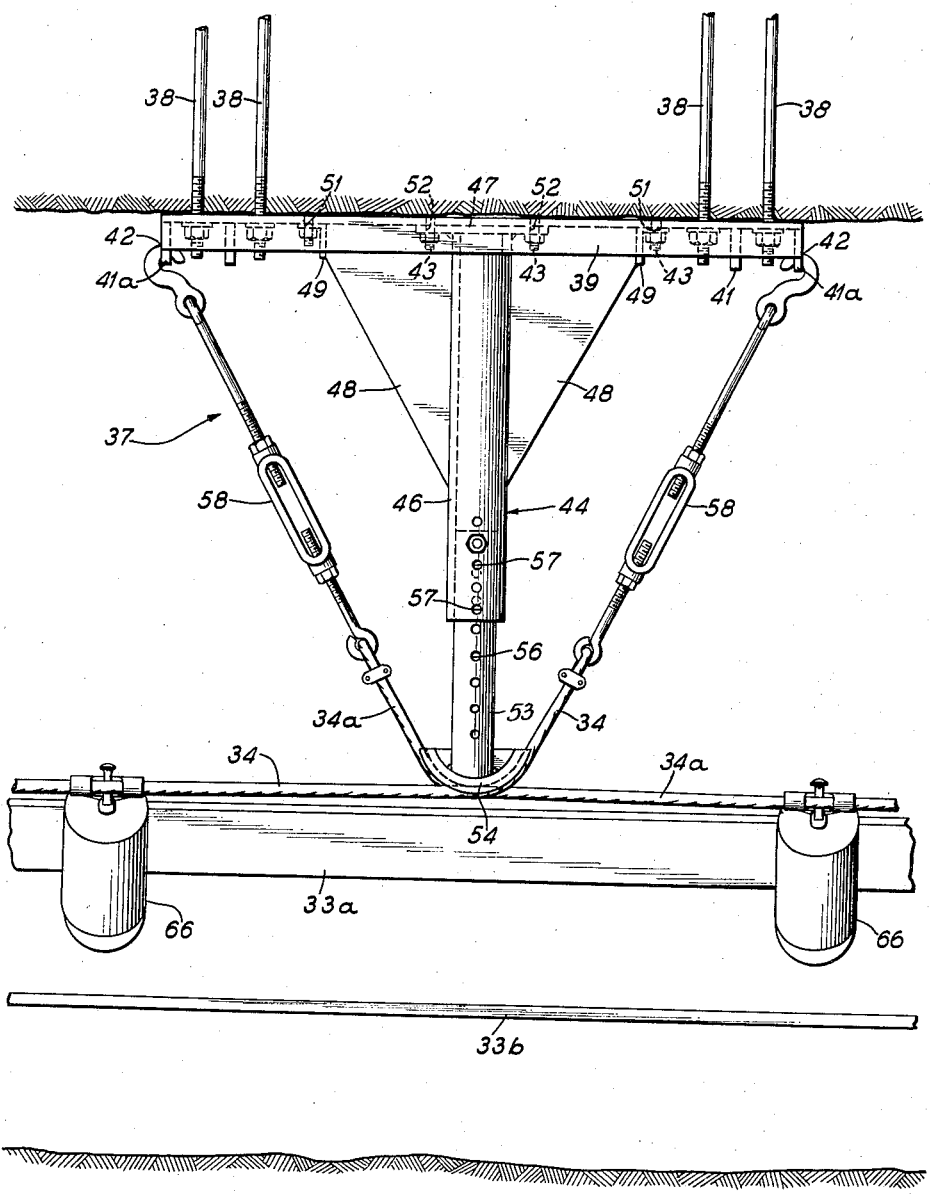
Figure 8 is a view similar to Figure 7, but taken along the line 8—8 of Figure 2 and showing the same ground-supporting anchors as they are employed at intermediate positions along the belt, with individual wire ropes extending in both directions to support individual portions of the belt.

As soon as the tail section is pulled beyond the liners 39 at the new position, the legs 44 will be lifted and bolted into place. Just to clarify the description, the anchors in the forward position in Figure 2 are designated 37a while the original, previously described anchors are designated 37. It will be understood that these may be the same identical anchors having liners 39 and legs 44. As shown in Figure 8, the new ropes 34a, 34a are hooked through plates 41a of the anchor 37 and trained forwardly around the curved shoe 54 and thence around the curved shoe 54a of the anchor 37a and up through the turnbuckle 58a to the plate 41a of the anchor 37a, note Fig. 2. Suitable adjustments will be made in the tube 53 to place the two ropes at approximately the same level. The ropes 34a will be tensioned by the turnbuckles, the supporting spreader-stands 59 put in place at intervals along the new section of the conveyor, and additional troughing idler units 66 inserted beneath the upper reach. The tail section 29 will then be jacked or pulled forward, properly aligned with the head section and then jacked down into place by the jacks 31, 31.

Additional extensions of the belt may be made in the same way until the room 21 is completely worked out.

While one form in which the present invention may be embodied has been shown and described it will be understood that various modifications and variations thereof may be effected without departing from the spirit and scope of the invention as defined by the appended claims.

We claim:

1. In an extensible flexible frame conveyor including end sections, one of which is movable relative to the other; an endless belt trained about and extending between said end sections; means fixedly spacing said end sections apart to maintain a load-carrying tension on the belt; flexible strand means disposed adjacent opposite sides of said belt; support means carried by said flexible strand means and supporting the belt; the improvement comprising, in combination with said flexible strand means tensioning means tensioning said flexible strand means; said one section being independent of and movable relative to the tensioning means; whereby said one end section can be shifted to release the belt tension preparatory to extending the conveyor to enable additional belting to be inserted without releasing the tension on the flexible strand means which supports the belt.

2. In an extensible flexible frame conveyor including a head section and a tail section; an endless belt trained about and extending between said head and tail sections in a load-carrying reach and a return reach; means fixedly spacing said head and tail sections apart to stretch the belt to maintain a load-carry tension in the load-carrying reach thereof; a pair of spaced parallel flexible strands disposed adjacent opposite sides of the belt; one end of each strand being fixed adjacent the head section; flexible support means carried by said flexible strands for supporting the load-carrying reach of the belt; the improvement comprising, in combination with said flexible strands anchor means for the other end of each strand; said anchor means being located remote from said head section; means fixing the other ends of said strands to the anchor means; and tensioning means for stretching and tensioning said strands independent of the belt; said tail section being independent of and movable relative to the anchor means and tensioning means; whereby the tensions in the belt and strands may be adjusted independently and whereby further the tail section may be shifted to completely release the belt tension prior to extending the conveyor in order that additional belting can be inserted without changing the tension on the strands which are supporting the belt.

3. The combination recited in claim 2 in which the anchor means is fixed to the ground.

4. In an extensible flexible frame conveyor; a head section; a tail section; direction-changing pulleys in each section; an endless belt trained respectively about said pulleys and extending between said sections in a load-carrying reach and a return reach; means fixedly spacing said sections apart to stretch the belt to maintain a load-carrying tension in the load-carrying reach thereof; a pair of spaced parallel flexible strands disposed along opposite sides of said belt; roller means carried by said flexible strands and supporting the load-carrying reach of the belt; one end of each strand being fixed adjacent said head section; anchor means for each side of the belt positioned remote from the head section and including a base portion fixed to the ground and a leg terminating in a guide shoe at a level determined by the height of the conveyor; said tail section being independent of and movable relative to said anchor means; each of said strands having the other end portion trained across said shoe and anchored to said base; and turnbuckle means for said strands effective to tension them independent of the belt tension; whereby the belt and strand tensions can be adjusted independently and whereby further the belt tension can be released completely for insertion of additional belting without changing the strand tension.

5. In an extensible flexible frame conveyor; a head section; a tail section; direction-changing pulleys in each section; an endless belt trained respectively about said pulleys and extending between said sections in a load-carrying reach and a return reach; means fixedly spacing said sections apart to stretch the belt to maintain a load-carrying tension in the load-carrying reach thereof; a pair of spaced parallel flexible strands positioned adjacent opposite sides of said belt; means carried by said flexible strands and supporting the load-carrying reach of the belt; anchor members having adjustable guides thereon for locating said strands in position; and tensioning means for tensioning said positioned strands; said tail section being independent of and movable relative to the anchor members and tensioning means; whereby the tail section can be shifted to release the belt tension preparatory to inserting additional belting without releasing the tension in said flexible strands.

6. In an extensible flexible frame conveyor; a head section; a tail section; direction-changing pulleys in each section; an endless belt trained respectively about said pulleys and extending between said sections in a load-carrying reach and a return reach; means fixedly spacing said sections apart to stretch the belt to maintain a load-carrying tension in the load-carrying reach thereof; a pair of spaced parallel flexible strands disposed along opposite sides of said belt; means carried by said flexible strands and supporting the load carrying reach; and anchor means fixed to the ground for anchoring said strands; said tail section being independent of and movable relative to the anchor means; whereby the tail section can be shifted to release the belt tension preparatory to inserting additional belting without releasing the tension in said flexible strands.

7. In an extensible flexible frame conveyor; a head section; a tail section; direction-changing pulleys in each section; an endless belt trained respectively about said pulleys and extending between said sections in a load-carrying reach and a return reach; means fixedly spacing said sections apart to stretch the belt to maintain a load-carrying tension in the load-carrying reach thereof; a pair of spaced parallel flexible strands disposed along opposite sides of said belt; means carried by said flexible strands and supporting the load-carrying reach; anchor means for anchoring said strands; and tensioning means for placing a desired amount of tension in said strands, said tail section being independent of and movable relative to both the anchor means and tensioning means; whereby the tail section can be shifted to release the belt tension preparatory to inserting additional belting without releasing the tension in said flexible strands.

8. In an extensible flexible frame conveyor; a head section; a tail section; direction-changing pulleys in each section; an endless belt trained respectively about said pulleys and extending between said sections in a load-carrying reach and a return reach; means fixedly spacing said sections apart to stretch the belt to maintain a load-carrying tension in the load-carrying reach thereof; a pair of spaced parallel flexible strands positioned adjacent opposite sides of said belt; means carried by said flexible strands and supporting the load-carrying reach; and means for positioning said strands; said tail section being independent of and movable relative to said second mentioned means; whereby the tail section can be shifted to release the belt tension preparatory to inserting additional belting without substantially changing the position of said flexible strands.

9. In an extensible flexible frame conveyor; head and tail sections, said tail section being movable relative to the head section; each section having a direction-changing pulley therein; an endless belt trained respectively about said pulleys and extending between said sections in a load-carrying reach and a return reach; means for fixing said sections in position to stretch the belt to maintain a load-carrying tension in the load-carrying reach thereof; a pair of flexible strands disposed on opposite sides of a portion of said belt adjacent the head section, each of said flexible strands having one end fixed adjacent the head section; anchor means fixedly positioned remote from the head section; said flexible strands having the other ends thereof fixed to said anchor means; tensioning means for tensioning said flexible strands independent of the tension in said belt; roller means carried by said flexible strands and supporting the portion of the belt; at least one other pair of flexible strands disposed on opposite sides of another portion of said belt; other anchor means fixedly positioned in longitudinally spaced relation to the first mentioned anchor means along said other belt portion; said other flexible strands having the opposite ends thereof fixed to said other anchor means; tensioning means for tensioning said other flexible strands independent of the tension in said belt; and other roller means carried by said other flexible strands and supporting the said another portion of the belt; said tail section being independent of and movable relative to each anchor means and tensioning means; whereby the belt tension can be completely released for insertion of additional belting without releasing the tension in any of said flexible strands.

10. The combination of claim 9 in which both anchor means are fixed to the ground.

11. The method of mining which comprises supporting a reach of an endless belt upon lengths of flexible strands intermediate spaced relatively movable inby and outby units, placing tension on said endless belt by positioning said inby unit relative to the outby unit, anchoring said lengths of flexible strand under tension, anchoring additional succeeding lengths of flexible strands under tension at further inby locations to provide series of independently anchored and tensioned flexible strands with the outby end of each additional succeeding length of flexible strands overlapping the inby end of the adjacent preceeding length of flexible strand and with said inby unit being movable relative to each length of the anchored and tensioned flexible strands, releasing the tension on said belt by moving the inby unit in an outby direction, inserting additional lengths of belting into the slackened belt to increase the length thereof to correspond to the increased distance between the units while maintaining the tension on each length of flexible strand to support the belt while the belt is being increased in length and then repositioning the inby unit relative to the outby unit to re-tension the belt.

12. An extensible flexible frame conveyor comprising at least one movable end section; an endless belt trained about said movable end section; said belt being tensioned to maintain a load-carrying tension thereon by the movement and positioning of said movable end section; flexible strand means; means disposing said strand means adjacent said belt; support means carried by said strand means for supporting the belt; and tensioning means tensioning said strand means; said movable end section being independent of and movable relative to said tensioning means; whereby said movable end section may be shifted in position to release the tension on the belt in preparation to extending the conveyor so that additional belting may be inserted without releasing the tension on the strand means which is supporting the so slackened belt.

13. In an extensible flexible frame conveyor; head and tail sections, said tail section being movable relative to the head section; an endless belt trained about and extending between said sections in a load-carrying reach and a return reach; means for fixing said sections in position to stretch the belt to maintain a load-carrying tension in the load-carrying reach thereof; a first pair of flexible strands disposed on opposite sides of a portion of said belt adjacent the head section, each of said first flexible strands having the outby end portion fixed adjacent the head section; a first anchor means fixedly positioned remote from the head section; said first flexible strands having the inby end portions thereof fixed to said first anchor means; tension means for tensioning said first flexible strands independent of the tension in the belt; first flexible support means carried by said first flexible strands for supporting the said portion of the load-carrying reach of the belt; a second pair of flexible strands each having the outby end portions thereof fixed to the first anchor means; said outby end portions of the second flexible strands and the inby end portions of the first flexible strands being in overlapping relationship to each other; said second flexible strands being disposed on opposite sides of another portion of the belt; second anchor means fixedly positioned in spaced relationship to the first anchor means; said second flexible strands having the inby end portions thereof fixed to said second anchor means; second tensioning means for tensioning said second flexible strands independent of the tension in the belt; and second flexible support means carried by said second flexible strands and supporting the another portion of the load-carrying reach of the belt; said tail section being independent of and movable relative to each anchor means and tensioning means; whereby the belt tension can be completely released for insertion of additional belting without releasing the tension in any of the said flexible strands.

14. The combination with an extensible belt conveyor having load carrying and return reaches, said conveyor being of the type where the load carrying reach is supported by flexible strand means, of means for supporting said strand means and anchoring same so as to maintain said strand means in tensioned condition for support of said load carrying reach comprising a liner member having means for securing same to a mine roof or the like, a frame separable from said liner member comprising a post consisting of telescoping members adjustable relatively to each other and including means for maintaining said members in fixed telescoping relationship, a plate extending normal to the axis of said telescoping members, means supported by said liner member for securing said plate thereto, braces extending from said plate to one of said telescoping members including means on said braces cooperating with other securing means on said line for additionally securing said frame thereto, means at the free end of said telescoping members for guiding said flexible strand means, means for anchoring an end of said flexible strand means to said liner, and turnbuckle means interposed between said guiding means and said last named anchoring means for tensioning said flexible strand means.

15. The combination with an extensible belt conveyor having load carrying and return reaches, said conveyor being of the type where the load carrying reach is supported by flexible strand means, of means for supporting said strand means and anchoring same so as to maintain said strand means in tensioned condition for support of said load carrying reach comprising a liner member having means for securing same to a mine roof or the like, a frame separable from said liner member comprising a post consisting of telescoping members adjustable relatively to each other and including means for maintaining said members in fixed telescoping relationship, a plate extending normal to the axis of said telescoping members, means supported by said liner member for securing said plate thereto, braces extending from said plate to one of said telescoping members including means on said braces cooperating with other securing means on said liner for additionally securing said frame thereto, means at the free end of said telescoping members for guiding said flexible strand means, and means for anchoring an end of said flexible strand means to said liner.

References Cited in the file of this patent

UNITED STATES PATENTS

| | | |
|---|---|---|
| 255,224 | Westland | Mar. 21, 1882 |
| 656,405 | Hewitt | Aug. 21, 1900 |
| 1,651,253 | Clifford | Nov. 29, 1927 |
| 1,748,301 | McKinlay | Feb. 25, 1930 |